UNITED STATES PATENT OFFICE.

SAMUEL KATZPROWSKY, OF BERKELEY, CALIFORNIA.

PROCESS OF TREATING DRIED FRUIT.

1,253,045.   Specification of Letters Patent.   Patented Jan. 8, 1918.

No Drawing.   Application filed July 11, 1917. Serial No. 179,932.

*To all whom it may concern:*

Be it known that I, SAMUEL KATZPROW-SKY, a citizen of Russia, and a resident of Berkeley, county of Alameda, and State of California, have invented a certain new and useful Process of Treating Dried Fruit, of which the following is a specification.

The invention relates to a process of treating raisins, prunes, figs and other fruits which are dried.

An object of the invention is to check the sugaring of dried fruits.

Another object of the invention is to improve the appearance of dried fruit.

The invention possesses other advantageous features, some of which, with the foregoing will be set forth at length in the following description where I shall outline in full the preferred method of carrying out the process of my invention. I shall describe the process in connection with raisins, but it is to be understood that it may be used with figs, prunes and other dried fruit.

The process may be applied to grapes or to raisins. When applied to grapes, the bunches of grapes after being cut from the vines are dipped in a solution containing dextrin, preferably in the form of glucose which contains dextrin. The solution is prepared by dissolving commercial glucose in water until a solution of approximately 36° Balling is obtained. The solution is kept heated to nearly the boiling point and the grapes are immersed for from 10 to 20 seconds, so as to completely cover them with a coat of glucose. The increase in weight due to dipping should be about 7% so that the increase in weight due to the glucose alone will be approximately 2½%. I have found that this amount of glucose is advisable to thoroughly seal the grape and prevent sugaring of the resultant raisin, but some grapes require less glucose to produce this result. After dipping the grapes are dried in the sun or otherwise, as usual and during the drying the glucose forms a glossy tough coat, which gives the raisins an attractive appearance and prevents the skin of the raisin from cracking and the consequent sugaring of the pulp. Each raisin is inclosed in an adhering glucose envelop which reinforces the skin and seals the raisin against contact with the air.

When applied to raisins, the glucose solution has a strength of from 36° to 46° Balling and is heated as above stated and the raisins are similarly dipped. The time of immersion and the strength of the solution varies with the characteristics of the raisins, but the raisins should be dipped so that the dried glucose adds from 2% to 3½% to the weight of the raisins. After dipping the rasins are heated to evaporate the water of solution and this is preferably accomplished by heating the raisins to a temperature of 200 Fahrenheit for a short time. When the raisins are to be seeded they are heated with steam and seeded. The heating with steam softens the glucose envelop, rendering it liquid or semi-liquid, so that it flows on the surface of the raisin and seals the punctures produced in the seeding operation. When desired the raisins may be coated after seeding, and if so treated, they must again be dried to remove the water added by dipping. Prunes and figs may be treated in the same manner.

The dextrin or glucose besides forming an inclosing envelop, prevents the crystallization of the sugar.

I claim:

1. The process of treating fruit which consists in covering the fruit with an adhering envelop of material containing dextrin.

2. The process of treating fruit which consists in covering the fruit with an adhering envelop of glucose.

3. The process of treating fruit which consists in immersing the fruit in a solution containing dextrin and then drying the fruit.

4. The process of treating fruit which consists in covering the fruit with an adhering envelop of glucose which weighs not less than 2% of the weight of the fruit.

5. The process of treating fruit which consists in immersing the fruit in a hot water solution of glucose whereby the fruit becomes coated with the solution and then drying the solution.

6. The process of preventing the sugaring of dried fruit which consists in coating the fruit with an envelop of material containing dextrin.

7. Dried fruit having an adhering envelop of dextrin containing material completely covering the fruit.

In testimony whereof, I have hereunto set my hand at California, this 6th day of July, 1917.

SAMUEL KATZPROWSKY.

In presence of—
H. G. PROST.